United States Patent
Kamada

(10) Patent No.: US 12,342,805 B1
(45) Date of Patent: Jul. 1, 2025

(54) FLY BOX WITH INTEGRATED TIPPET CUTTER

(71) Applicant: Satoshi Stephen Kamada, Anaheim Hills, CA (US)

(72) Inventor: Satoshi Stephen Kamada, Anaheim Hills, CA (US)

( * ) Notice: Subject to any disclaimer, the term of this patent is extended or adjusted under 35 U.S.C. 154(b) by 0 days.

(21) Appl. No.: 18/679,412

(22) Filed: May 30, 2024

(51) Int. Cl.
 *A01K 97/06* (2006.01)

(52) U.S. Cl.
 CPC .................................. *A01K 97/06* (2013.01)

(58) Field of Classification Search
 CPC ...................................................... A01K 97/06
 See application file for complete search history.

(56) References Cited

U.S. PATENT DOCUMENTS

| | | | |
|---|---|---|---|
| 2,076,257 A | | 4/1937 | Perkins et al. |
| 3,197,915 A | * | 8/1965 | Staver ..................... A01K 97/06 43/57.1 |
| 4,020,584 A | * | 5/1977 | Michal .................... A01K 97/06 43/57.1 |
| 4,026,063 A | * | 5/1977 | Allen ...................... A01K 97/06 220/555 |
| 6,301,825 B1 | | 10/2001 | Doreian |
| 6,889,469 B1 | * | 5/2005 | Chung .................... A01K 97/06 43/57.1 |
| 8,468,739 B2 | | 6/2013 | Murphy |
| 11,122,788 B2 | * | 9/2021 | Noel, Sr. ................ A01K 97/06 |
| 11,737,442 B2 | | 8/2023 | Byes |
| 2006/0162234 A1 | * | 7/2006 | Gagnet ................... A01K 97/06 43/57.1 |
| 2008/0203207 A1 | * | 8/2008 | Krauland ............. A01K 89/003 242/287 |
| 2017/0265448 A1 | | 9/2017 | Duffy |

FOREIGN PATENT DOCUMENTS

WO    WO2023000016    1/2023

\* cited by examiner

*Primary Examiner* — Richard G Davis
(74) *Attorney, Agent, or Firm* — Larry K. Roberts

(57) ABSTRACT

An embodiment of a fishing fly box includes a generally rectangular open case defining an interior space for holding fishing flies including ferromagnetic hooks. The case is defined by a side wall structure extending from a base surface. A locking lid is configured for sliding movement along opposed top edges of the side wall structure, between an open position and a closed position in which the lid is slid forward with its leading edge abutting an edge of the case at the first side wall of the case. One or more magnets are positioned in the side wall structure or base surface. A blade edge is attached to the case in the interior space and exposed at a notch formed in the side wall structure, and is covered by the lid with the lid in the closed position.

12 Claims, 4 Drawing Sheets

FIG. 2

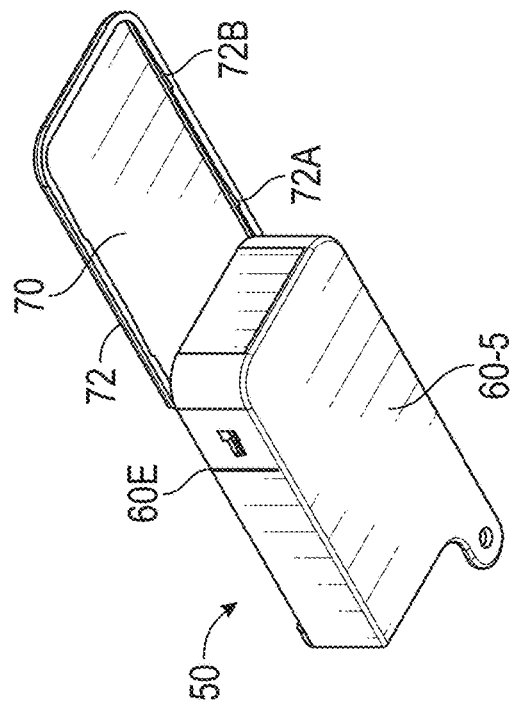
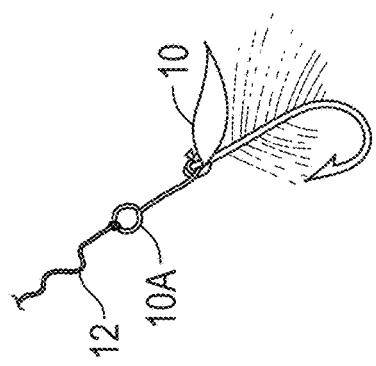
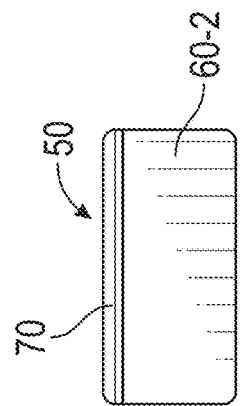
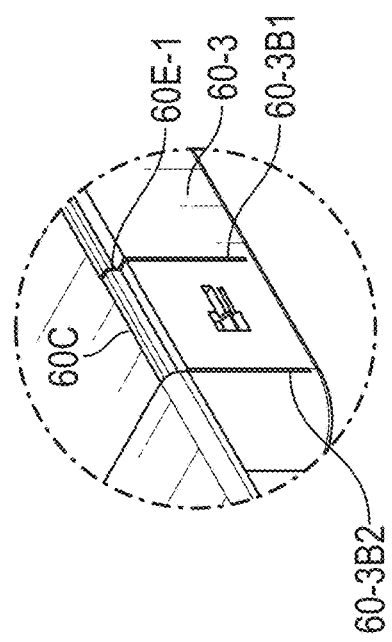
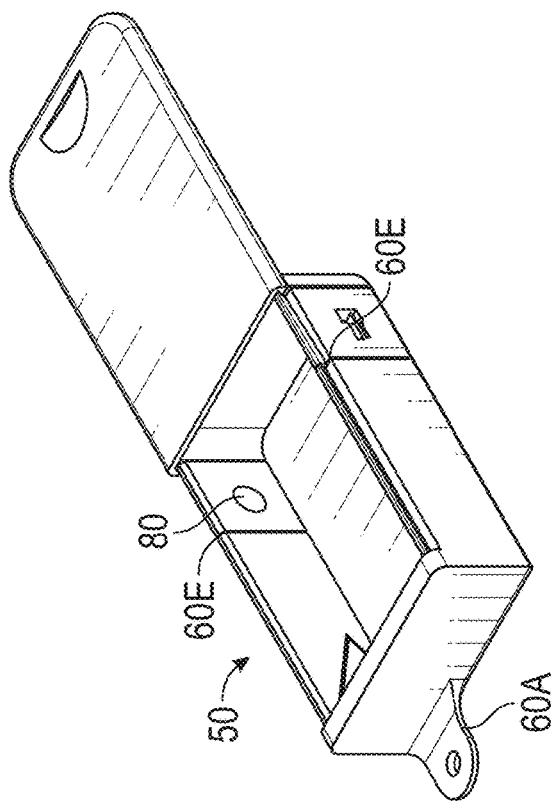

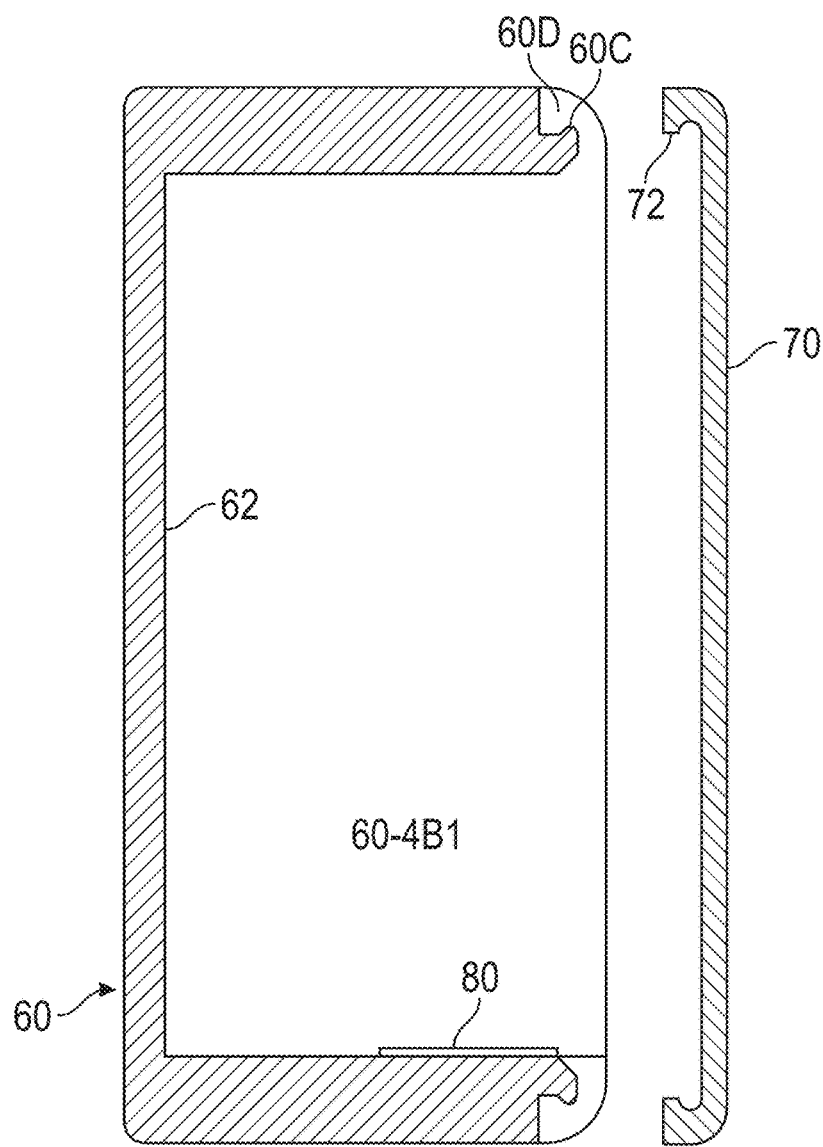
FIG. 9B  FIG. 9C
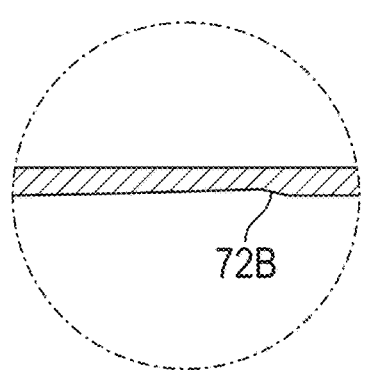
FIG. 9D
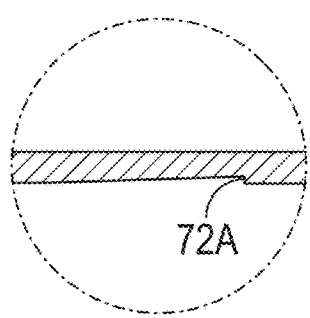
FIG. 9E
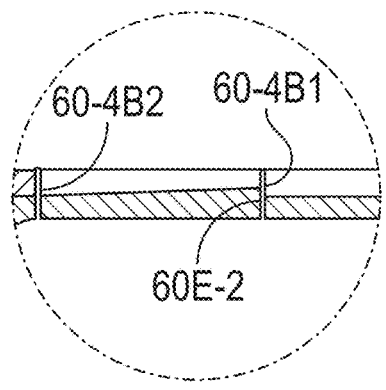
FIG. 9F

FLY BOX WITH INTEGRATED TIPPET CUTTER

BACKGROUND OF THE INVENTION

Fly fishing entails the use of artificial lures or "flies" attached to a leader or tippet material. The flies are typically metal hooks dressed with various materials to resemble natural baits such as insects in various metamorphic states, small fish fry, even mice or the like. The hooks are typically formed from ferromagnetic materials, such as iron, stainless steel, etc.

The flyfisher may change flies many times over the course of a day's fishing, in response to changed fishing conditions or efforts to "match the hatch." A fly is removed for replacement by a different fly by clipping the leader or tippet at or above the knot securing the fly to the line. The removed fly must then be either returned to a fly box, a somewhat time-consuming task, or, more quickly, temporarily secured to a fly patch on the flyfisher's vest or other gear. The fly patch may typically be a sheepskin or foam patch, and the fly on the fly patch may be susceptible to dislodgement and loss through inadvertent contact with the flyfisher's other gear or other obstructions.

BRIEF DESCRIPTION OF DRAWINGS

Features and advantages of the disclosure will readily be appreciated by persons skilled in the art from the following detailed description when read in conjunction with the drawing wherein:

FIG. 4 is an enlarged view of the portion of the fly box within circle 4 of FIG. 4.

FIG. 5 is a cutaway isometric view of the fly box of FIG. 1.

FIG. 6 is another isometric view of the fly box of FIG. 1 illustrating placement of one of the magnets fitted into a side of the case.

FIG. 7 is an end view of the fly box of FIG. 1 with the lid in a closed position.

FIG. 8 is a representation of an exemplary fly attached to a fishing line, leader or tippet.

FIG. 9B is a cross-sectional view of the case, taken along line 9B-9B of FIG. 9A.

FIG. 9C is a cross-sectional view of the lid, taken along line 9C-9C of FIG. 9A.

FIG. 9D is an enlarged view of the portion of the lid within circle 9D of FIG. 9A.

FIG. 9E is an enlarged view of the portion of the lid within circle 9E of FIG. 9A.

FIG. 9F is an enlarged view of the portion of the case within circle 9F of FIG. 9A.

DETAILED DESCRIPTION

Figure 1:
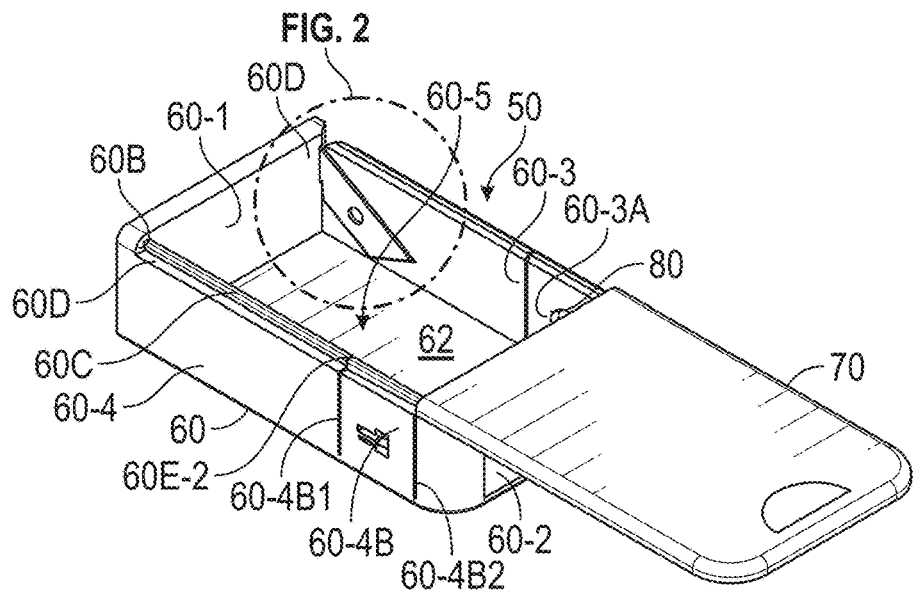
FIG. 1 is an isometric view of a fly box in accordance with aspects of the invention, with its lid in an open position to show the cutter and magnet position.
Figure 2:
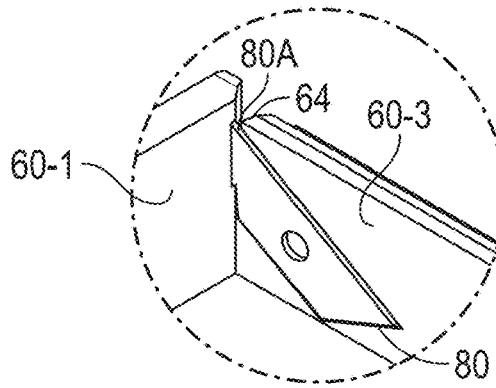
FIG. 2 is an enlarged view of the portion of the fly box within circle 2 of FIG. 1.
Figure 3:
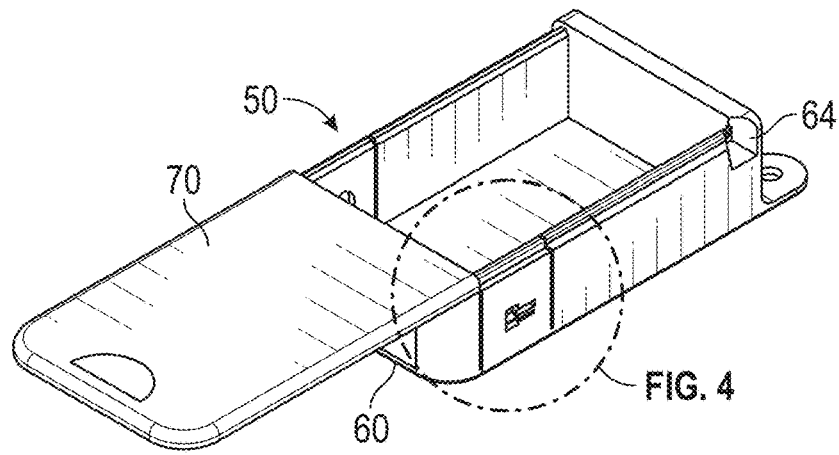
FIG. 3 is an isometric view of the fly box of FIG. 1 taken from the opposite side of the fly box.

In the following detailed description and in the several figures of the drawing, like elements are identified with like reference numerals. The figures may not be to scale, and relative feature sizes may be exaggerated for illustrative purposes.

In accordance with aspects of the invention, a fly box 50 is disclosed in FIGS. 1-7, comprising a generally rectangular open case 60 defining an interior space 62 for holding fishing flies. The case is defined by first and second opposed side walls 60-1 and 60-2 joined by third and fourth side walls 60-3 and 60-4 extending from a base surface 60-5. In other embodiment, the open case may have a different configuration than rectangular.

A sliding, locking lid 70 is configured for sliding movement along tracks defined along a top edge of the case, between open positions illustrated in FIGS. 1, 3, 5 and 6 and a closed position in which the lid is slid forward with its leading-edge abutting edge 60B of the case (FIG. 1). A plurality of magnets including magnet 80 (FIG. 6) are press fitted into openings such as 60-3A formed in the longitudinal side wall 60-3 and in longitudinal side wall 60-4 of the case 60 adjacent the opposite side wall 60-2. In other embodiments, the magnets are located at different locations in the case, such as the second side wall or the base structure.

The box 50 includes a sharp blade edge 80A on a blade 80 attached in this exemplary embodiment to side wall 60-3. The blade is positioned so that the edge 80A is exposed sufficiently in a notch 64 formed in the side wall 60-3 so that a fishing fly such as exemplary fly 10 inserted into the opening 62 at the notch, by the flyfisher positions the attaching line 12 (which typically is formed by a monofilament leader or tippet material attached to a leader) at the blade edge 80A. The lid 70 is configured to close the open space 62 with the fly 10 inside the space 62 and line 12 draped over the notch 64, and when the fly fisher pulls upwardly the line 12 with the lid closed, the line 12 pulls the fly until the attaching line 12 engages the blade edge 80A and is severed, allowing the fly 10 to drop downwardly toward the opposite end of the case. The detached fly is magnetically attracted to one of the magnets 80, securing the fly 10 in the box. The tag end of the line 12 may be pulled out of the case even with the lid in a closed position, and a new fly knotted to the line 12. With the lid 70 in the closed position, the blade edge 80A is covered by the lid.

The case 60 and lid 70 may be fabricated of a rigid plastic material. The fly box 50 is preferably sized to fit into a shirt pocket. In one exemplary embodiment, the case has a length of 3.54 inches, a width of 2.17 inches, and a depth of 0.84 inches, with a lid length of 3.35 inches and a thickness of 0.13 inch. These dimensions are merely exemplary. Other embodiments may be smaller or larger, e.g. in the latter case to accommodate larger flies. The fly box may be also attached to a lanyard at tab 60A (FIG. 6) or attached to a vest.

Figure 9:
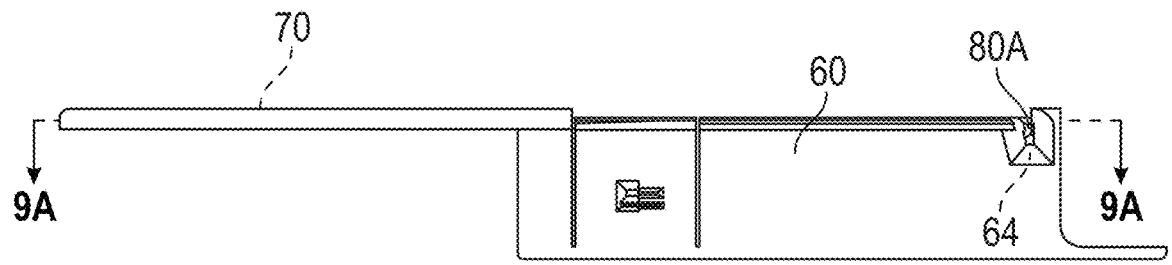
FIG. 9 is a side view of the fly box of FIG. 1, with the lid in an open position.

In an exemplary embodiment, top edges of the longitudinal side walls 60-3 and 60-4 are formed with tracks 60C which define channels 60D (FIG. 9B). The longitudinal edges of the lid 70 are formed with corresponding tracks 72 which are configured to fit into the channels 60D formed in the top edges of the longitudinal sides of the case (FIG. 9C). The cooperation of the channels 60D and the tracks 72 provides a sliding, constrained movement of the lid along the top edge of the case between open positions and the closed position.

The side walls 60-3 and 60-4 include tab portions 60-3B and 60-4B, which are joined to the case only adjacent the base surface 60-5, with slits separating the remainder of the tab portions from the respective side walls 60-3 and 60-4 except at the base surface. FIG. 4 illustrates slits 60-3B1 and 60-3B2 formed in the side wall 60-3 to define tab portion 60-3B. FIG. 1 illustrates slits 60-4B1 and 60-4B2 formed in side wall 60-4 to define tab 60-4B.

Figure 9A:
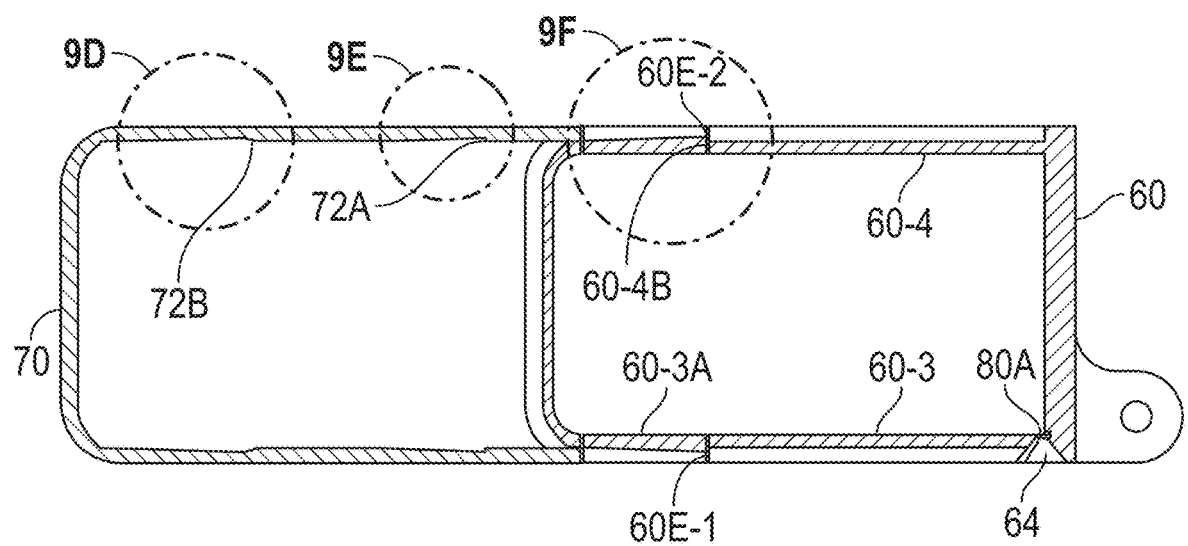
FIG. 9A is a cross-sectional view taken along line 9A-9A of FIG. 9.

The top surfaces of tab portions 60-3B and 60-4B of side walls 60-3 and 60-4 are formed with catches 60E-1 and 60E-2 (FIG. 9A). The catches are defined by an increase in the thickness in the respective tracks 60C, at the edge of the tab portions. The catches are configured to cooperate with spaced notches 72A, 72B formed in each of the lid tracks 72 to provide locking forces to hold the lid in the closed position or in a partially open position. The catches extend into the space generally occupied by the lid in the track. When the case is closed, the catches align with the lid's "soft" notches 72B. The "soft" notch 72B has an angled edge (FIG. 9D), letting the lid slide open if the user pushes the lid until the catch 60E is out of the notch. The lid's "hard" notch 72A has a squared edge (FIG. 9E) into which the catch is captured or locked with the lid in a partially open position, and is configured such that the lid will not readily slide open if the user pulls the lid, and instead requires the user to push in the tab portions 60-3B and 60-4B of the side walls 60-3 and 60-4 of the case to release the lock. With the catch 60E captured in notch 72A, the lid will be partially open. The lid may be removed from the case by pulling the lid back with the tab portions 60-3B and 60-4B pressed inwardly.

Although the foregoing has been a description and illustration of specific embodiments of the subject matter, various modifications and changes thereto can be made by persons skilled in the art without departing from the scope and spirit of the invention.

The invention claimed is:

1. A fishing fly box, comprising:
a generally rectangular open case defining an interior space for holding fishing flies including ferromagnetic hooks, the case defined by first and second opposed side walls joined by third and fourth side walls extending from a base surface;
a locking lid configured for sliding movement along opposed top edges of the third and fourth side walls of the case, between one or more open positions and a closed position in which the lid is slid forward with its leading edge abutting an edge of the case at the first side wall of the case;
a notch opening formed in the case or locking lid;
one or more magnets positioned in one of the first, second, third or fourth side walls or the base surface;
a blade edge attached to the case in the interior space and exposed at the notch opening so that a line portion attached to a fishing fly positioned into the interior space contacts the blade and is severable by the blade edge, allowing the fly to drop for magnetically attraction to the one or more magnets, securing the fly in the box, and wherein the blade edge is covered by the lid with the lid in the closed position.

2. The fly box of claim 1, wherein the blade edge is secured to the third side wall.

3. The fly box of claim 1, wherein respective top edges of the third and fourth side walls each define a channel, and opposed edges of the lid each define a track configured to fit within a corresponding channel of the third and fourth side walls and to provide a sliding fit of the lid along the top edges.

4. The fly box of claim 3, wherein the third and fourth side walls are formed with catches extending from the channels, the catches configured to cooperate with spaced notches formed in each of the lid tracks to provide a locking force tending to hold the lid in the closed position or in a partially open position.

5. The fly box of claim 4, wherein the spaced notches formed in each of the lid tracks comprise a first track notch having an angled or ramped edge allowing the lid to slide open when the lid is pushed away from the leading edge, and a second track notch having a vertical edge configured to hold the lid in a partially open position until a pushing force is applied to the third and fourth side walls to release the second track notch from the catch to allow the lid to be removed from the case.

6. The fly box of claim 1, wherein the notch opening is formed in the case at an edge of the third side wall.

7. The fly box of claim 1 wherein the case is a unitary structure formed of a rigid plastic material, the third and fourth side walls having a pair of spaced slits formed therein to define respective first and second tab portions connected to the case only adjacent the base surface, the plastic material having a resilience to allow flexing inwardly of the first and second tab portions in response to externally applied pressures.

8. The fly box of claim 7, wherein:
the third and fourth side walls are each formed with catches extending from the channels, the catches configured to cooperate with spaced notches formed in each of the lid tracks to provide a locking force tending to hold the lid in the closed position or in a partially open position; and
wherein the spaced notches formed in each of the lid tracks comprise a first track notch having an angled or ramped edge allowing the lid to slide open when the lid is pushed away from the leading edge, and a second track notch having a vertical edge configured to hold the lid in a partially open position until a pushing force is applied to the third and fourth side walls to release the second track notch from the catches to allow the lid to be removed from the case.

9. The fly box of claim 1, wherein the case further includes a protruding tab structure configured for attachment to a lanyard.

10. The fly box of claim 1, wherein the one or more magnets includes a first magnet secured to the third side wall and a second magnet secured to the fourth side wall.

11. The fly box of claim 1, wherein the case and lid are sized so that the fly box fits into a flyfisher's shirt pocket.

12. A fishing fly box, comprising:
an open case defining an interior space for holding fishing flies including ferromagnetic hooks, the case defined by a side wall structure extending from a base surface;
a locking lid configured for sliding movement along opposed top edges defined on the side wall structure of the case, between one or more open positions and a closed position in which the lid is slid forward with its leading edge abutting an edge of the case;
a notch opening formed in the case or locking lid;
one or more magnets positioned in the side wall structure or the base surface;
a blade edge attached to the case in the interior space and exposed at the notch opening so that a line portion attached to a fishing fly positioned into the interior space contacts the blade and is severable by the blade edge, allowing the fly to drop for magnetic attraction to the one or more magnets, securing the fly in the box, and wherein the blade edge is covered by the lid with the lid in the closed position.

\* \* \* \* \*